(12) United States Patent
Cook

(10) Patent No.: US 7,726,927 B2
(45) Date of Patent: Jun. 1, 2010

(54) QUICK-ADJUST FOR SNOWMOBILE CLUTCH

(76) Inventor: Travis Cook, 176 Smith Creek Rd., Prairie, ID (US) 83647

(*) Notice: Subject to any disclaimer, the term of this patent is extended or adjusted under 35 U.S.C. 154(b) by 882 days.

(21) Appl. No.: 11/540,942

(22) Filed: Sep. 28, 2006

(65) Prior Publication Data
US 2008/0080952 A1    Apr. 3, 2008

(51) Int. Cl.
*F16B 23/00* (2006.01)

(52) U.S. Cl. .............. 411/398; 74/571.1; 192/110 R; 474/14

(58) Field of Classification Search .......... 411/389; 192/110 R; 474/14; 74/568 R, 571.1
See application file for complete search history.

(56) References Cited

U.S. PATENT DOCUMENTS

| | | | | | |
|---|---|---|---|---|---|
| 1,009,244 | A | * | 11/1911 | Hartsough | 384/269 |
| 1,044,055 | A | * | 11/1912 | Johnoson | 403/107 |
| 1,612,500 | A | * | 12/1926 | Ezbelent et al. | 74/54 |
| 3,191,262 | A | * | 6/1965 | Gustafson | 407/4 |
| 3,248,966 | A | * | 5/1966 | Renker | 74/568 R |
| 4,575,363 | A | * | 3/1986 | Burgess et al. | 474/14 |
| 5,104,141 | A | * | 4/1992 | Grove et al. | 280/86.753 |
| 5,209,703 | A | * | 5/1993 | Mastine et al. | 474/14 |
| 6,128,943 | A | * | 10/2000 | Lemmens | 72/409.01 |
| 6,302,416 | B1 | * | 10/2001 | Schmack | 280/93.512 |

OTHER PUBLICATIONS

Bombadier Recreational Products Company; Snowmobile Parts and Repair Manual, 2005; Section 05 Transmission: Subsection 03 (Drive Pulley).

* cited by examiner

*Primary Examiner*—Gary Estremsky

(57) ABSTRACT

An apparatus is disclosed for aiding in the speed and simplicity of the adjustment of the clicker-style cam bolts employed by TRA-type snowmobile drive clutches, manufactured by Bombardier Recreational Products. The apparatus comprises a barrel type nut with a collared head and a compression wire spring which fits telescopically over said nut and against said collared head, and a locking set screw to secure the apparatus against rotational movement or removal. This assembly replaces the conventional hexagonal lock nut presently used on TRA-type drive clutches. This apparatus enables the user to change the linear position of the cam bolt in the drive clutch housing to enable the hexagonal head of the clicker-style bolt to clear its respective hexagonally indexed pocket, which is molded into the drive clutch housing, and to be turned to any one of six different degrees of rotation, thereby changing the shift-out RPM setting of the drive clutch quickly and with greater ease than conventional methods.

7 Claims, 3 Drawing Sheets

QUICK-ADJUST FOR SNOWMOBILE CLUTCH

BACKGROUND OF THE INVENTION

Related Art

The present invention relates to the hexagonal-headed eccentric bolt assembly (to be referred to as clicker-style cam bolts herein), used to adjust flyweight ramp angle on TRA-style snowmobile drive clutches, manufactured by Bombardier Recreational Products of Canada. Particularly, this invention relates to the replacement of the hexagonal locking nut used to retain the clicker-style cam bolts in place.

When in use, the drive clutch flyweights engage multiple angular ramps inside the drive clutch body. The angle of these ramps in respect to the flyweights determines the shift-out RPM, or revolutions per minute, of the clutch. By changing the angle of these ramps, the peak shift RPM can be changed to optimize performance. The eccentric surface of the clicker-style cam bolts, having a varying surface in relation to the degrees of rotation of the bolts' axis, engage a spur on the backside of these ramps, and through rotational adjustment of the bolts, alter the distance in which the ramp is held away from the rotational axis of the cam bolts, ultimately changing shift-out RPM as is well understood in the art. The clicker-style cam bolts have hexagonal heads which fit into hexagonally shaped index pockets that are cast into the drive clutch housing. These clicker-style cam bolts are conventionally held in place by locking nuts that are threaded onto the end of the bolt opposite the hexagonal head. Conventionally, adjustment is made using a hand wrench to loosen the locking nuts to a sufficient point in which the entire assemblies can be pushed out of place and turned to a desired setting and then be re-tightened into place again. This adjustment is commonly made several times during a vehicle outing, and can be difficult and time consuming using the conventional means. For example, according to the prior art adjustment technique, the clicker-style cam bolt may be easily accidentally totally removed, in which case its inside washer will fall off, and possibly, both the cam bolt and the washer may be lost. Various attempts at speeding up and simplifying this adjustment have been made, including the use of a socket and ratchet to remove the nut more quickly, but still a better method is needed to provide a precise adjustment in a timely manner.

SUMMARY OF THE INVENTION

Accordingly, it is the primary object of the present invention to provide an easily applicable means by those skilled in the art for the adjustment of the clicker-style cam bolts as employed in TRA-style drive clutches used on snowmobiles.

It is another object of the present invention to simplify the means of adjustment for the clickers in TRA-style drive clutches.

It is yet another object of the present invention to provide a new adjustment means that is as durable or more durable than the conventional item it replaces.

An apparatus is disclosed for aiding in the speed and simplicity of the adjustment of the clicker-style cam bolts employed by TRA-type snowmobile drive clutches, manufactured by Bombardier Recreational Products. The apparatus comprises a barrel type nut with a collared head and a compression wire spring which fits telescopically over said nut and is restrained against said collared head, and preferably a locking set screw to secure the apparatus against rotational movement or removal. This assembly replaces the conventional hexagonal lock nut presently used in TRA type drive clutches. This new apparatus enables the user to change the linear position of the cam bolt in the drive clutch housing to allow means for the hexagonal head of the clicker-style bolt to clear its respective hexagonally indexed pocket, which is molded into the drive clutch housing, and to be turned to any one of six different degrees of rotation, thereby changing the shift-out RPM setting of the drive clutch quickly and with greater ease than conventional methods.

Accordingly, in the illustrated embodiment of the present invention, the conventional clicker-style cam bolts are held in place by preferably a hard anodized high strength aluminum barrel-type nut, the collared head of which constrains a wire compression spring against the body of the drive clutch and around the body of the barrel nut. This barrel nut is secured to the threads of the clicker-style cam bolt by means of a set screw threaded into the end of the barrel nut which "jams" the barrel nut into place.

The outside diameter of the main portion of the barrel nut and the inside diameter of the compression wire spring are of such dimensions, for example, about one-thousandths of an inch difference, so as to allow the unrestricted movement of the spring coils over the body of the barrel nut. Optionally, a threaded connection cement may be applied to the set screw before insertion in order to further secure it and the cam bolt. This assembly is threaded onto the threaded end of the clicker-style cam bolt and secured against rotation or removal by the set screw, and the optional thread cement, inserted into the threaded portion of the barrel nut. Either by hand or by using a simple T-handle wrench, the entire assembly can be pushed toward the clutch body and rotated (clockwise or counterclockwise), after the cam bolt head has cleared the clutch housing, to the desired setting. When released, the force provided by the compression spring returns the clicker-style cam bolt to its operational position and retains the entire assembly as would the conventional locking nut of the prior art.

BRIEF DESCRIPTION OF THE DRAWINGS

The accompanying drawings illustrate several aspects of embodiments of the present invention. The drawings are for the purpose only of illustrating preferred modes of the invention and are not to be construed as limiting the invention.

DETAILED DESCRIPTION OF THE PREFERRED EMBODIMENTS

Figure 1:
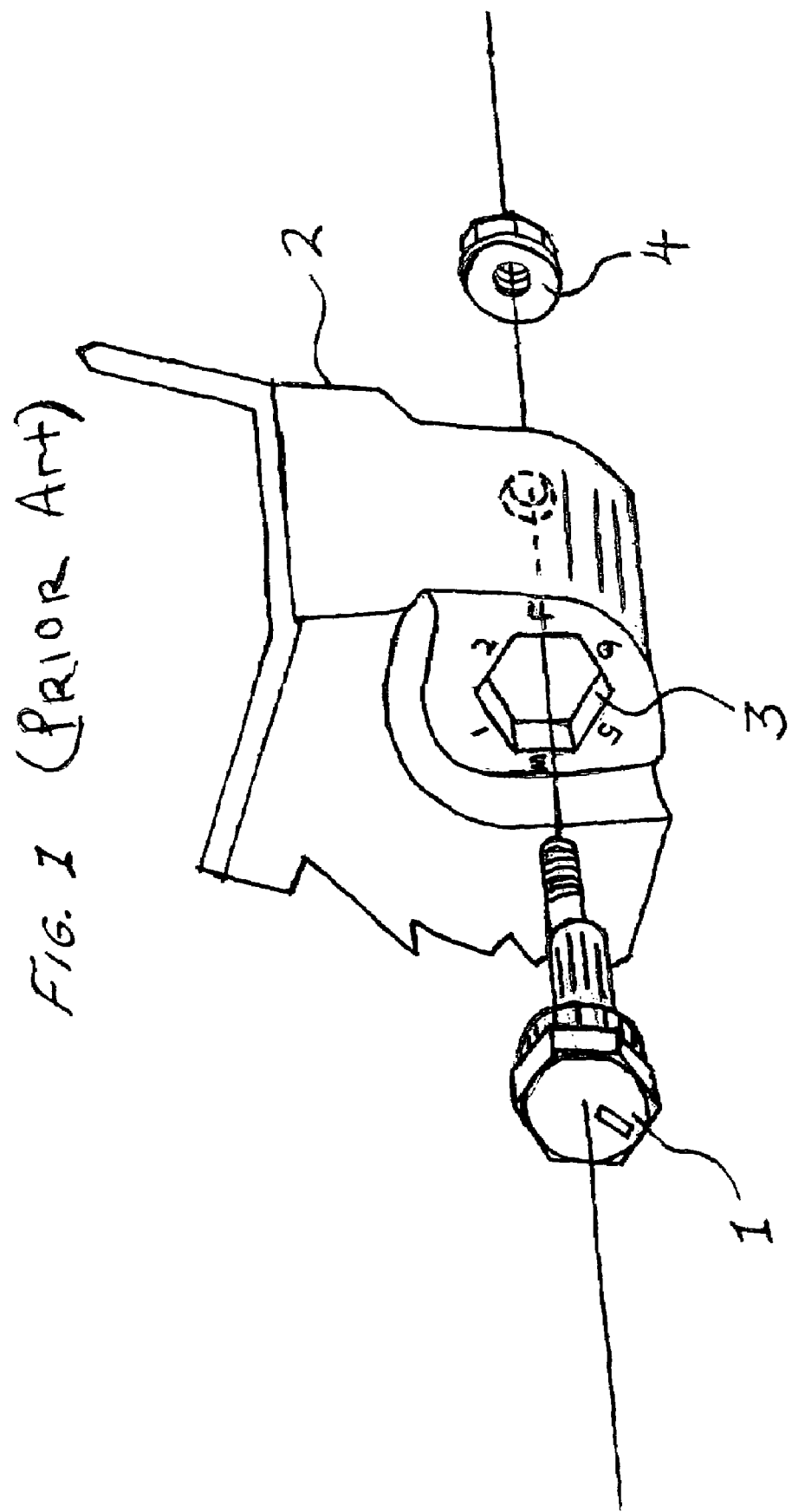
FIG. 1 is a schematic, partial exploded view of the prior art and its respective application.
Figure 2:
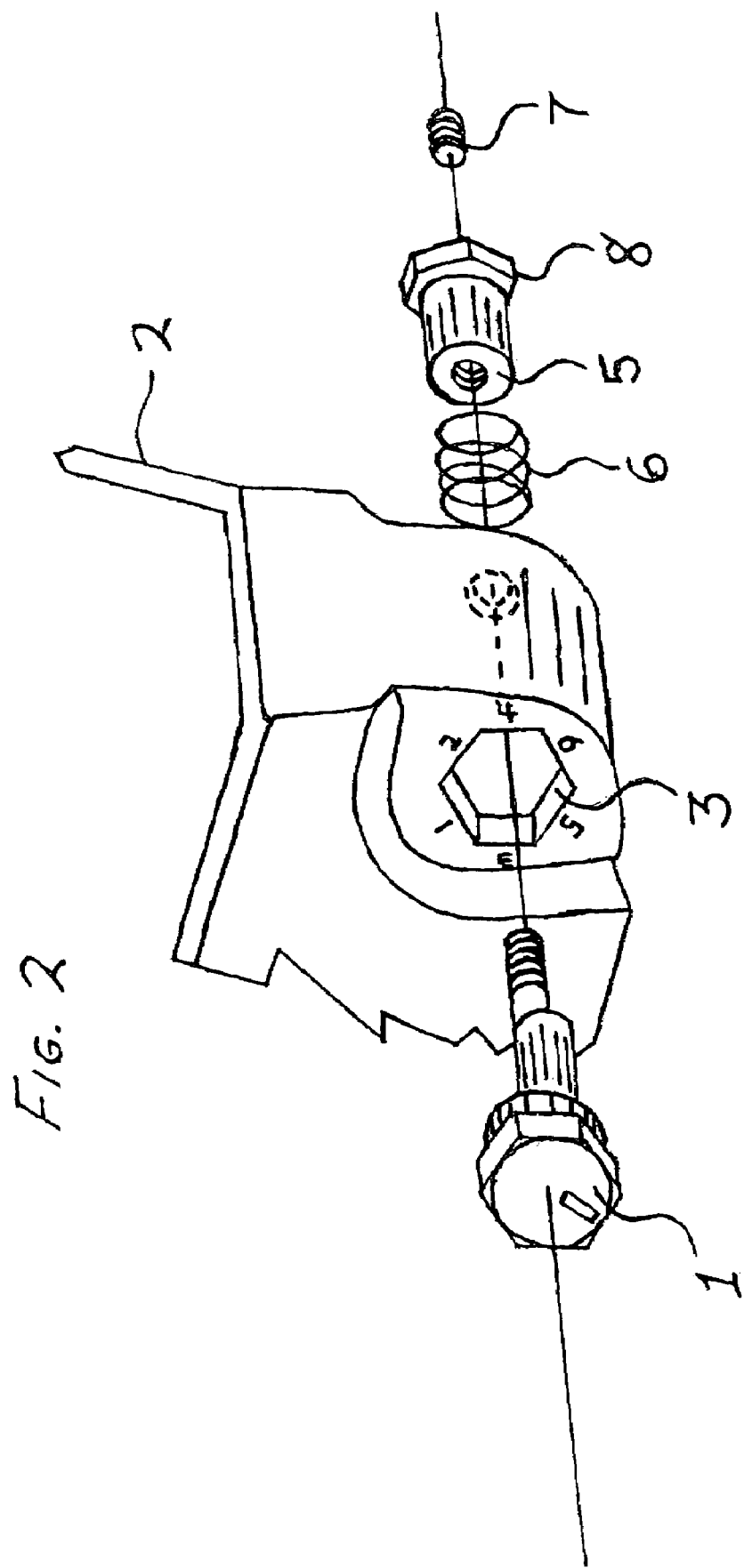
FIG. 2 is a schematic, exploded view of the present invention adapted to the clutch housing of the prior art.
Figure 3:
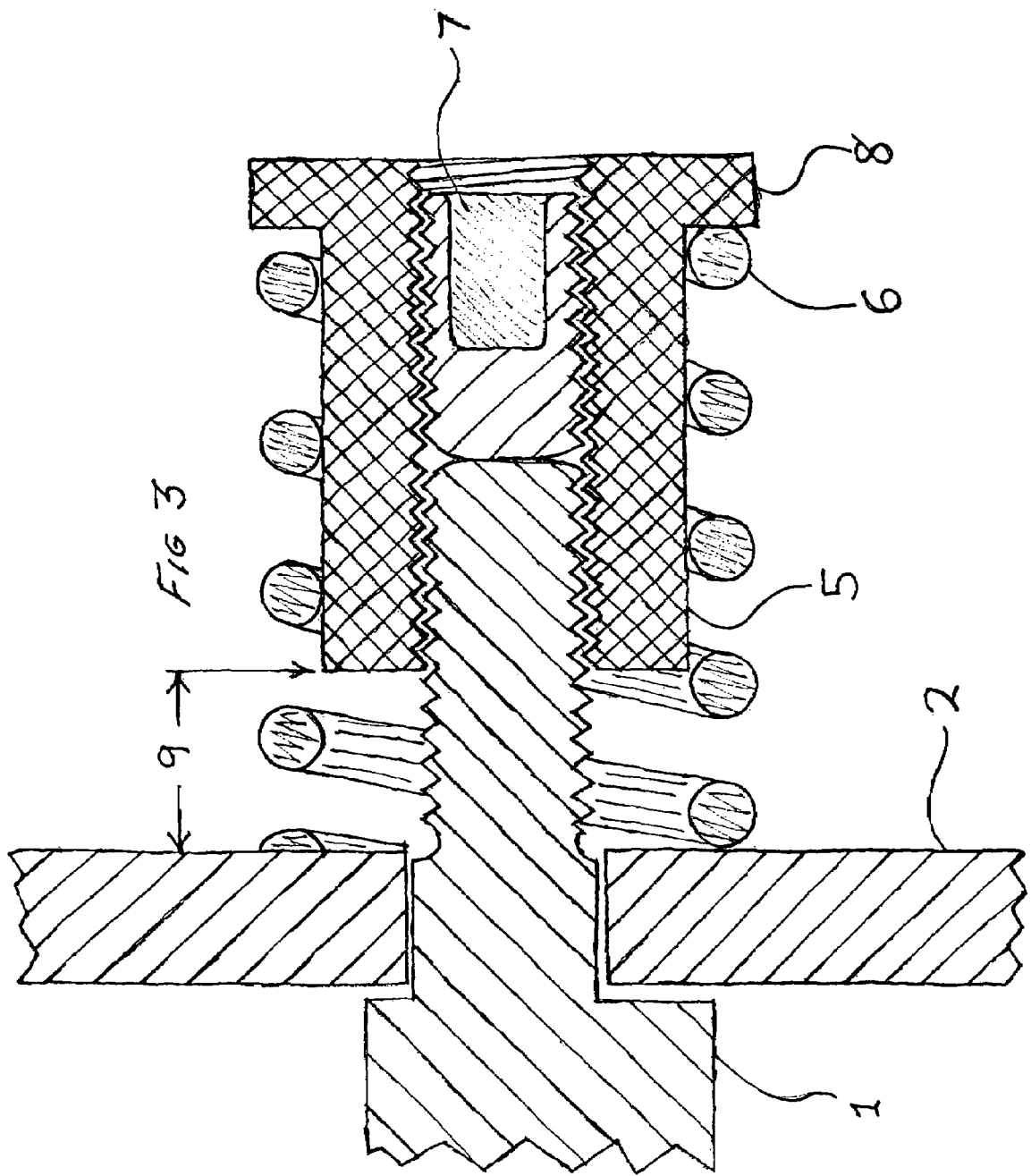
FIG. 3 is a side schematic detail cut-away view of the present invention and its respective parts.

The present invention is intended to be applied in direct replacement of an existing component of the prior art. More specifically, the present invention is designed to replace the lock nut used to retain the clicker-style cam bolt used in TRA-type snowmobile drive clutches.

The hexagonal head of clicker-style cam bolt 1 is shaped to fit into indexed pocket 3 of drive clutch housing 2. Conventionally, clicker-style cam bolt 1 would be held in position in drive clutch housing 2 by locking nut 4, however, locking nut 4 of the prior art is replaced by the present invention in the following way; barrel nut 5 is threaded onto the end opposite the hexagonal head of clicker-style cam bolt 1 and is retained from removal by set screw 7. Spring 6, which fits externally over barrel nut 5, provides expansion force between drive clutch housing 2 and barrel nut 5 and is held in check on barrel nut 5 by retaining shoulder 8 of the nut's collared head. When barrel nut 5, which is secured to clicker-style cam bolt 1, is depressed fully towards drive clutch housing 2 against the force and inside the body of spring 6, and thereby consuming free space 9, the hexagonal head of clicker-style cam bolt 1 is allowed to clear the indexed pocket 3 of drive clutch housing 2 and is thus enabled for rotational adjustment.

When manual pressure is released from barrel nut 5, clicker-style cam bolt 1 is forced to return to fixed position within the indexed pocket 3 of drive clutch housing 2 by means of the expansion force provided by spring 6 between retaining shoulder 8 and drive clutch housing 2. Barrel nut 5 and spring 6 are secured by set screw 7, and directly replace locking nut 4 in the prior art, and function to serve the same purpose of locking nut 4, yet serve also to allow for rapid and convenient adjustment of the clicker-style cam bolt.

What is important for the present invention is that the eccentric bolt be associated with a spring, which spring is restrained relative to the said eccentric bolt, and said spring is also restrained relative to the drive clutch housing. This way, relative motion between the eccentric bolt and the drive clutch housing may be enabled, so that the eccentric bolt may be pushed to release it from its fit in the shaped, index pocket in the drive clutch housing, but still under pressure from the spring, so that upon removal of the push force, the eccentric bolt is automatically returned to a secure fit in pocket in the drive clutch housing. In the meantime, the eccentric bolt may have been rotated by the operator in order to adjust peak shift RPM in the snowmobile.

In this regard, the spring may be a coil spring as shown in the Figures, or a leaf spring, or any other conventional spring structure. Also, the spring may be restrained relative to the eccentric bolt and relative to the drive clutch housing in any conventional manner, for example, by welding or soldering, or by other restraint structure, as in the collared barrel nut as shown in the Figures.

Although this invention has been described above with reference to particular means, materials, and embodiments, it is to be understood that the invention is not limited to these disclosed particulars, but extends instead to all equivalents within the scope of the following claims.

I claim:

1. In an eccentric bolt assembly used to adjust peak shift revolutions per minute (RPM) in a snowmobile drive clutch assembly, a bolt head of the eccentric bolt being adapted to fit into a shaped index pocket in the drive clutch housing, the improvement which comprises:
   a spring restrained relative to said eccentric bolt, said spring also being restrained relative to said drive clutch housing, so that the eccentric bolt may be pushed and its bolt head clear the drive clutch housing for rotation of the eccentric bolt for adjustment of the snowmobile peak shift RPM.

2. In an eccentric bolt assembly used to adjust peak shift RPM in a snowmobile drive clutch assembly, a bolt head of the eccentric bolt being adapted to fit into a shaped index pocket in the drive clutch housing, the improvement which comprises:
   a barrel-type nut with a collared head secured to the eccentric bolt on an end opposite the bolt head, and a spring that fits over said nut and is restrained against said collared head and is adapted to be restrained also against said drive clutch housing, so that the eccentric bolt may be pushed and its bolt head clear the drive clutch housing for rotation of the eccentric bolt for adjustment of the snowmobile peak shift RPM.

3. The eccentric bolt assembly of claim 2, wherein the barrel type nut is secured to the eccentric bolt by a set screw.

4. The eccentric bolt assembly of claim 3, wherein the set screw is coaxial with the barrel nut and near its collared head.

5. The eccentric bolt assembly of claim 2, wherein the barrel-type nut is secured to the eccentric bolt by threaded connection cement.

6. In a method for adjusting peak shift RPM in a snowmobile drive clutch assembly, wherein a bolt head of an eccentric bolt is adapted to fit into a shaped index pocket in the drive clutch housing, the improvement that comprises:
   pushing the eccentric bolt to clear the drive clutch housing, and rotating the eccentric bolt for adjustment of the snowmobile peak shift RPM against a spring that is restrained relative to said eccentric bolt, said spring also being restrained relative to said clutch housing.

7. In a method for adjusting peak shift RPM in a snowmobile drive clutch assembly, wherein a bolt head of an eccentric bolt is adapted to fit into a shaped index pocket in the drive clutch housing, the improvement that comprises:
   pushing the eccentric bolt to clear the drive clutch housing, and rotating the eccentric bolt for adjustment of the snowmobile peak shift RPM against a spring that fits over a barrel-type nut with a collared head secured to the eccentric bolt on an end opposite the bolt head, said spring being restrained against said collared head and against said drive clutch housing.

* * * * *